UNITED STATES PATENT OFFICE.

GABRIEL ANTOINE FAURIE, OF ST. DENIS, FRANCE.

PROCESS OF MANUFACTURING ALLOYS OF METAL OF THE ALUMINIUM GROUP.

SPECIFICATION forming part of Letters Patent No. 432,698, dated July 22, 1890.

Application filed August 20, 1887. Serial No. 247,461. (No specimens.)

*To all whom it may concern:*

Be it known that I, GABRIEL ANTOINE FAURIE, engineer, of St. Denis, (Seine,) in the Republic of France, have invented Improvements in the Process of Manufacturing Alloys of Metal of the Aluminium Group, of which the following is a specification.

The object of this invention is the industrial preparation of that group of metals which are volatilizable with difficulty and have a great affinity for oxygen, and which are usually separated from their chlorides by means of sodium or potassium.

The invention has particular reference to the manufacture of alloys of metals of the aluminium group—namely, aluminium, calcium, magnesium, silicon, and other not easily volatile metals of the group in question.

I will describe the invention first in relation to aluminium, merely stating that the other metals of the aforesaid group can be isolated the same way by merely using equivalent quantities of their corresponding salts or oxides.

The invention is based upon the following fact: that if sulphur, carbon, and alumina, or salts of the latter with non-metallic acids, are intimately mixed together, a sulphide of carbon will tend to form as soon as the temperature of red heat is reached. These vapors, being in contact with an intimate mixture of carbon and alumina, will reduce the latter substance into sulphide of aluminium. If now the temperature be raised to a white heat, the sulphide of aluminium is reduced by the carbon in excess to aluminium in a pulverulent form, bisulphide of carbon escaping.

To obtain the intimate mixture above mentioned the following among several other plans can be adopted: To about half a liter of petroleum, spirits of turpentine, tar, or other hydrocarbon are added about fifteen hundred grams of alumina reduced to a fine powder. The mixture is then stirred to form a paste that kneads well. On this paste is poured five hundred grams of commercial sulphuric acid, which is then stirred up in order to obtain a homogeneous mass. This mass is then thrown into a crucible and heated to a red heat until the hydrocarbon is decomposed and a solid mass results. This is then allowed to cool down, and is reduced to powder. Half its weight of zinc, copper, iron, or lead is then added, and the whole is placed in a crucible, which is carefully luted and raised to a white heat, and kept at that temperature for two or three hours and then allowed to cool. When cool, the crucible is opened and is found to contain a dark powder, together with grains of a more or less rich alloy. These grains are sorted out and melted again to form ingots. The powder is added to the next batch of material.

Instead of operating in a crucible, a cupola smelting-furnace or a low-blast furnace may be used.

I claim as my invention—

1. The process of manufacturing the alloys of metals of the aluminium group, which consists in exposing an intimate mixture of the oxide of the group metal, carbon, and sulphuric acid to an intense heat, mixing therewith filings of the alloying metal, and exposing the mixture to a white heat, all substantially as set forth.

2. The process of manufacturing the alloys of metals of the aluminium group, which consists in calcining a mixture of the oxide or a salt of the group metal, sulphuric acid, and a hydrocarbon, intimately mixing therewith filings of iron or other metal, and exposing the mixture to a white heat, all substantially as set forth.

3. The improvement in the process of manufacturing alloys of metal of the aluminium group, which consists in heating to a white heat a mixture of carbon, the oxide of the group metal, the alloying metal, and sulphuric acid, then cooling the mixture, separating the globules, and utilizing the powder by adding it to the next batch of the original mixture.

In testimony whereof I have signed my name to this specification in the presence of two subscribing witnesses.

GABRIEL ANTOINE FAURIE.

Witnesses:
LÉON FRANEKEN,
ROBT. M. HOOPER.